United States Patent [19]

Matsuda

[11] Patent Number: 4,615,668
[45] Date of Patent: Oct. 7, 1986

[54] APPARATUS FOR MELT-FORMING BOTTOM STOP OF SLIDE FASTENER CHAIN

[75] Inventor: Yasuhiko Matsuda, Toyama, Japan
[73] Assignee: Yoshida Kogyo K.K., Tokyo, Japan
[21] Appl. No.: 668,494
[22] Filed: Nov. 5, 1984

[30] Foreign Application Priority Data

Dec. 12, 1983 [JP] Japan ............... 58-191438[U]

[51] Int. Cl.$^4$ .................................................. B29C 65/08
[52] U.S. Cl. ................................. 425/145; 156/580.2; 425/150; 425/174.2; 425/814
[58] Field of Search ............... 264/23; 425/110, 121, 425/124, 127, 814, 174.2, 145, 150; 156/580.1, 580.2

[56] References Cited

U.S. PATENT DOCUMENTS

| | | | |
|---|---|---|---|
| 3,672,008 | 6/1972 | Moertel | 264/23 |
| 3,686,719 | 8/1972 | Johnston et al. | 264/23 |
| 3,735,469 | 5/1973 | Moertel et al. | 425/174.2 |
| 3,770,361 | 11/1973 | Heimberger | 425/174.2 |
| 3,804,577 | 4/1974 | Gaus | 425/174.2 |
| 4,054,973 | 10/1977 | Moertel et al. | 425/174.2 |
| 4,170,617 | 10/1979 | Akashi | 425/814 |
| 4,257,839 | 3/1981 | Yoshida et al. | 425/814 |
| 4,259,272 | 3/1981 | MacFee | 264/23 |
| 4,348,245 | 9/1982 | MacFee | 425/174.2 |
| 4,505,659 | 3/1985 | Chijiishi et al. | 425/150 |

FOREIGN PATENT DOCUMENTS

2835206 3/1979 Fed. Rep. of Germany ...... 425/814

*Primary Examiner*—Willard E. Hoag
*Attorney, Agent, or Firm*—Hill, Van Santen, Steadman & Simpson

[57] ABSTRACT

A bottom stop melt-forming apparatus melt-forms a bottom stop on a continuous slide fastener chain which alternately has a portion in which elements of a thermoplastic synthetic resin material are interlocked with each other and a space portion in which no element is present. The apparatus includes: a device which advances the slide fastener chain; a positioning member having a positioning projection which is adapted to enter the space portion and to engage an element at the rear edge of the space portion; a device which is adapted to sense the engagement between the positioning projection and the element and to stop the advance of the fastener chain; an ultrasonic horn which is disposed in close proximity to the positioning projection; and an anvil which is adapted to clamp and press the fastener chain between the same and the ultrasonic horn after the fastener chain has stopped. The apparatus further includes a groove which is formed on the positioning member and is adapted to slidably guide the anvil.

1 Claim, 12 Drawing Figures

APPARATUS FOR MELT-FORMING BOTTOM STOP OF SLIDE FASTENER CHAIN

BACKGROUND OF THE INVENTION

1. Field of the Invention

The present invention relates to an apparatus for forming a bottom stop on a continuous slide fastener chain having elements of a thermoplastic synthetic resin material interlocked with each other by melting the thermoplastic synthetic resin material by means of an ultrasonic horn at a position on the fastener chain which is adjacent to a space portion of the slide fastener chain.

2. Description of the Prior Art

A typical conventional bottom-stop forming apparatus of the type described above has been arranged such that a projection which enters a space portion of a continuous slide fastener chain is engaged with an element at the rear edge of the space portion in order to effect positioning of the fastener chain, and then a plurality of elements near the space edge portion are clamped and melted by means of an ultrasonic horn and an anvil which are provided independently of the projection, thereby forming a bottom stop. Such conventional arrangement, however, encounters the following problems: Since the anvil is provided independently of the positioning projection, there are unfavorably variations in position of the anvil with respect to the projection, which disadvantageously involves variations in position of bottom stops. Further, there is a possibility that the anvil may come in contact with the thread which is employed to attach the elements to respective strips of tape, such as to damage the thread. Moreover, since the anvil is independent of the projection, it is inconveniently difficult to allow the anvil to move while keeping it in contact with the projection. In consequence, a gap is undesirably formed between the projection and the anvil, which makes it difficult to form a bottom stop in which the elements constituting the bottom stop have completely been melted as far as the lower-most end of the fastener element rows.

SUMMARY OF THE INVENTION

In view of the above-described problems with the prior art, it is a primary object of the present invention to provide a bottom stop melt-forming apparatus which is arranged such as to allow the position of the anvil to be accurately regulated with respect to the positioning projection.

To this end, according to the present invention, a groove is provided on a positioning member which has a portion thereof defining the positioning projection, and the anvil is slidably guided by the groove, whereby the positional relationship between the projection and the anvil is kept unchanged.

The above and other objects, features and advantages of the present invention will become clear from the following description of the preferred embodiment thereof, taken in conjunction with the accompanying drawings.

DESCRIPTION OF THE PREFERRED EMBODIMENTS

Figure 1:
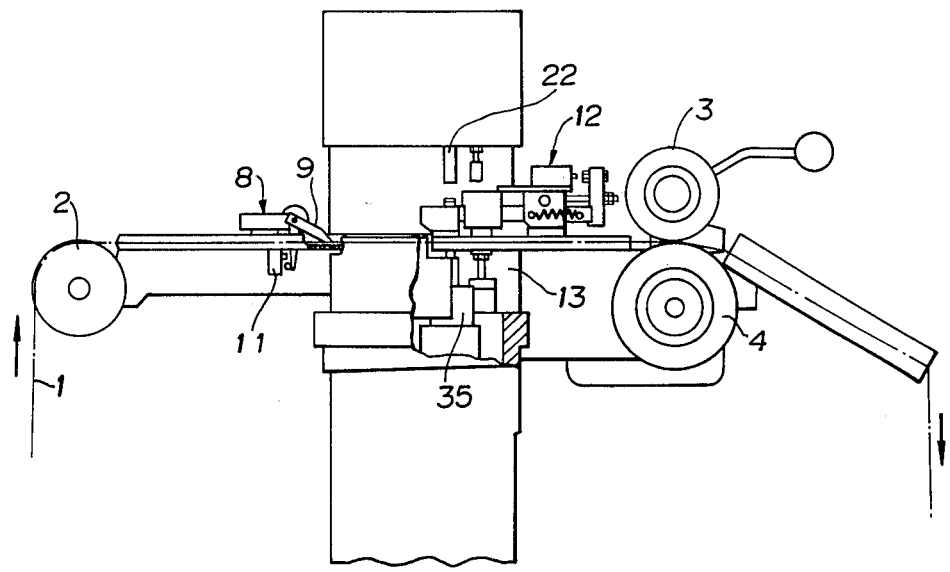
FIG. 1 is a side elevational view of an apparatus for melt-forming a bottom stop of a slide fastener chain in accordance with the present invention.
Figure 2:
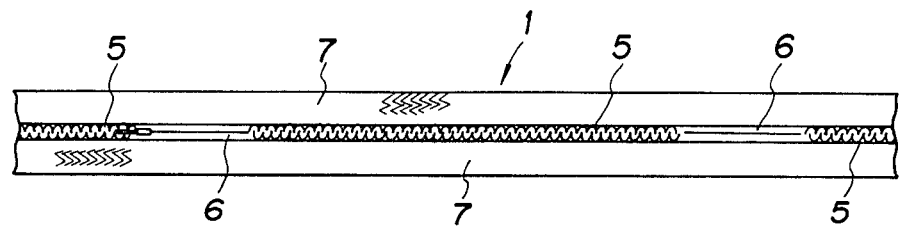
FIG. 2 is a plan view of a slide fastener chain.
Figure 3:
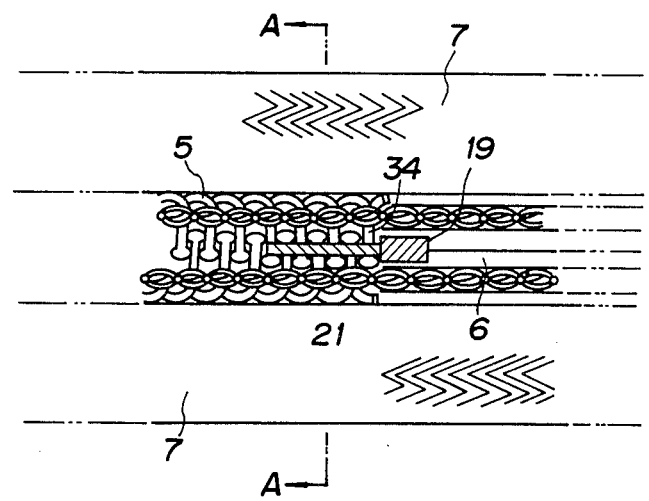
FIG. 3 is an enlarged view of a portion of the slide fastener chain shown in FIG. 2, additionally showing the projection of a positioning member and an anvil for melting which are employed in the apparatus shown in FIG. 1.
Figure 4:
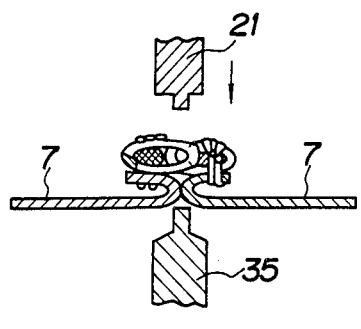
FIG. 4 is a sectional view taken along the line A—A of FIG. 3, showing the state wherein the anvil has not been lowered.

FIG. 1 is a side elevational view of a bottom stop melt-forming apparatus in accordance with the present invention, showing the arrangement of the apparatus as a whole. The arrangement is such that a continuous slide fastener chain 1 is passed over a guide roller 2 and is advanced by means of feed rollers 3 and 4. The fastener chain 1 has, as shown in FIG. 2, fastener element rows 5 interlocked with each other, and space portions 6 each disposed between the adjacent element rows 5 in which no element is present. As shown in FIGS. 3 and 4, in this embodiment, each element row 5 is constituted by a coiled element member of a thermoplastic synthetic resin material. In addition, these element rows 5 are respectively sewn on two strips of tape 7 such as to form a concealed fastener.

As shown in FIG. 1, a space sensor 8 is provided on the downstream side of the guide roller 2. The sensor 8 includes a sensor lever 9 which is adapted to be pivotal such as to enter any space portion, and a microswitch 11 which is actuated by a pivoting motion of the lever 9.

Figure 12:
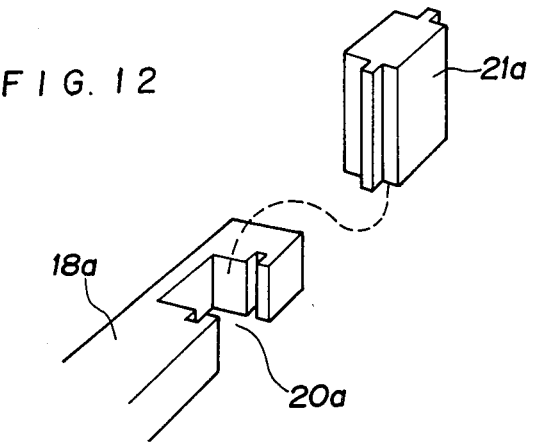
FIG. 12 is a perspective view of a modification of the arrangement of the positioning member and the anvil.
Figure 6:
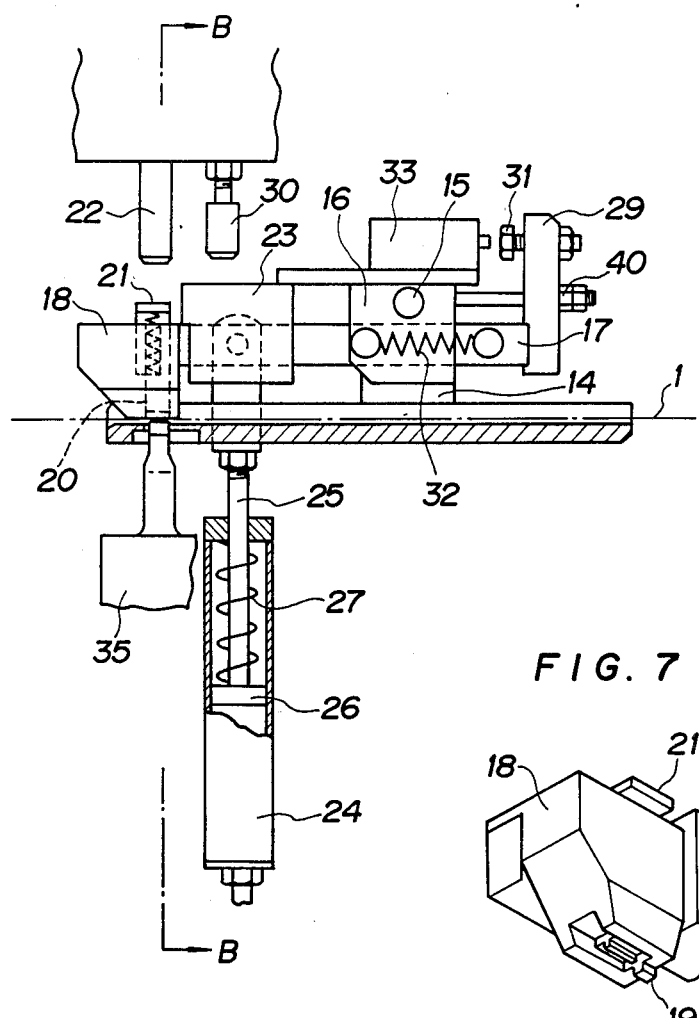
FIG. 6 is a detailed side elevational view of a positioning device employed in the apparatus shown in FIG. 1.
Figure 7:
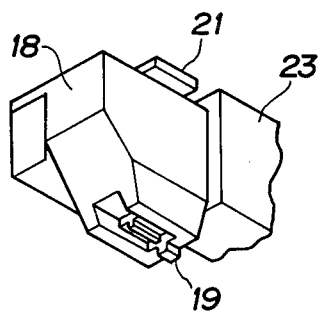
FIG. 7 is a perspective view of the positioning member and the ultrasonic horn shown in FIG. 6.
Figure 7:
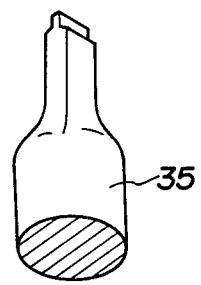
Figure 8:
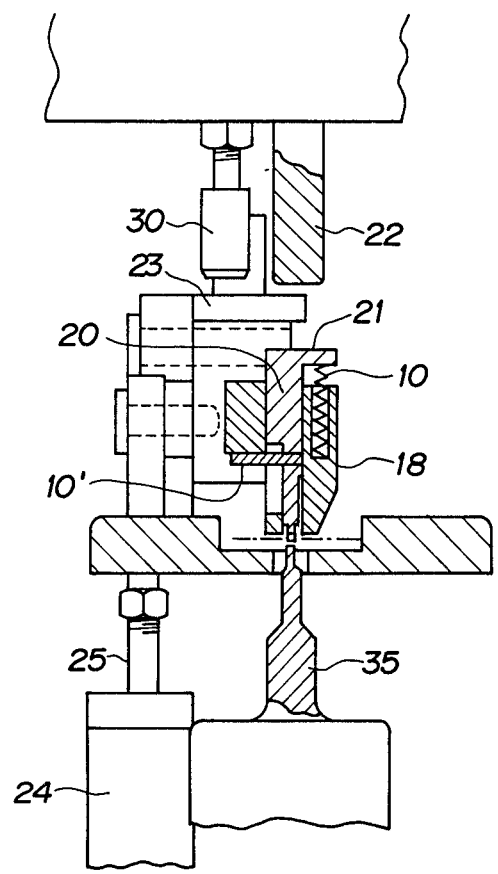
FIG. 8 is a sectional view taken along the line B—B of FIG. 6.

A positioning device 12 is provided on the downstream side of the space sensor 8. The positioning device 12 includes, as best shown in FIG. 6, a bracket 14 which is secured to a frame 13 (see FIG. 1), a pivoting block 16 which is pivotally attached to the bracket 14 by a pin 15, and a slide rod 17 which is supported such as to be slidable with respect to the block 16. A positioning member 18 is attached to one end of the slide rod 17. The positioning member 18 has a positioning projection 19 (see FIG. 7) which is adapted to enter a space portion 6. The positioning member 18 further has a guide groove 20, in which an anvil 21 is slidably housed. The groove 20 has one of the side walls thereof continuing with the projection 19. Accordingly, when moving downwardly, the anvil 21 slides along the projection 19. The anvil 21 is upwardly urged by means of a spring 10 and is positioned by a stopper 10'. Therefore, the anvil 21 is normally prevented from downwardly projecting beyond the bottom surface of the positioning member 18 but is allowed to move downwardly by being pushed by a plunger 22 of a fluid cylinder when the plunger 22 is moved downwardly at the timing which will be explained later. It is to be noted that although the above-described embodiment employs the groove 20 which is formed in the positioning member 18, another type of groove 20a may be employed, in place of the groove 20, which opens to one of the sides of a positioning member 18a as shown in FIG. 12. In such case, the cross-sectional configuration of an anvil 21a, together with that of the groove 20a, should be designed such as to prevent an anvil 21a from being displaced sidewardly.

Figure 9:
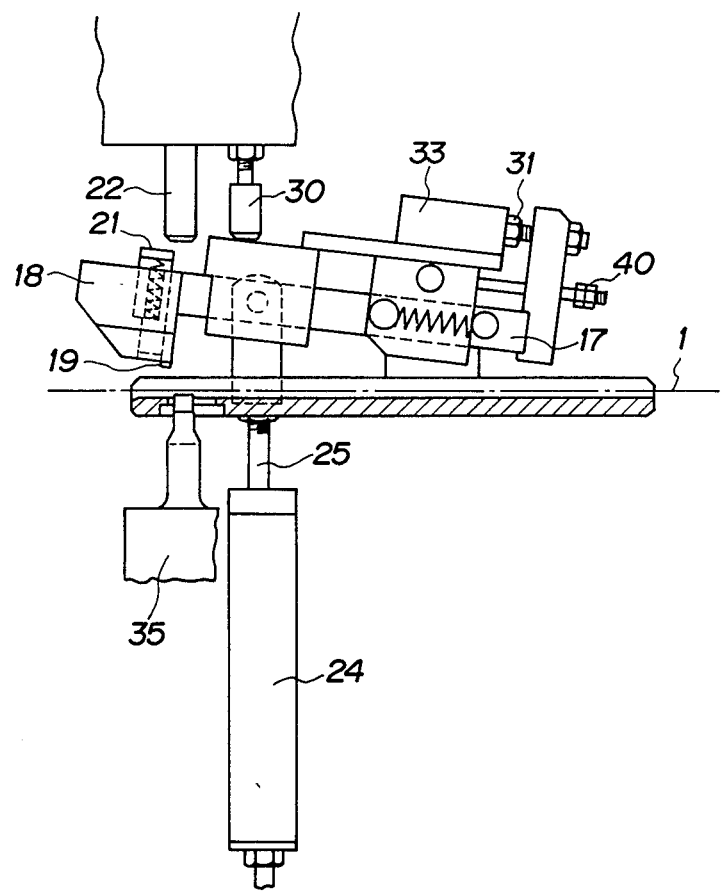
FIGS. 9, 10 and 11 are side elevational views of the apparatus shown in FIG. 6, respectively showing the apparatus in various steps of the bottom stop melt-forming operation.

The slide rod 17 is further adapted to support a push-down block 23 such that the block 23 is slidable with respect to the slide rod 17. To the push-down block 23 is pivotally attached a plunger 25 of an air cylinder 24. A piston 26 connected to the plunger 25 is downwardly urged by means of a spring 27. Accordingly, the positioning member 18 is constantly subjected to a downward force but is upwardly pivoted, as shown in FIG. 9, when the air cylinder 24 is actuated such as to raise the plunger 25, whereby the projection 19 is removed from the moving path of the fastener chain 1. The upward pivoting motion of the positioning member 18 is restricted by a stopper 30.

An arm 29 is secured to the other end of the slide rod 17. An adjustable bolt 31 is supported at the upper portion of the arm 29. Further, the slide rod 17 is urged leftwardly as viewed in FIG. 6 by means of a spring 32 stretched between the slide rod 17 and the pivoting block 16. Accordingly, the bolt 31 normally presses a limit switch 33 attached to the pivoting block 16 so that the switch 33 is ON. However, when the slide rod 17 is moved rightwardly as viewed in FIG. 6 against the tensile force of the spring 32 by the fact that the projection 19 enters a space portion 6 of the moving fastener chain 1 to engage an element 34 at the rear edge of the space portion 6, the bolt 31 is separated from the microswitch 33, thus causing the switch 33 to turn OFF. The rightward movement of the slide rod 17 is restricted by a stopper 40 attached to the pivoting block 16.

Figure 5:
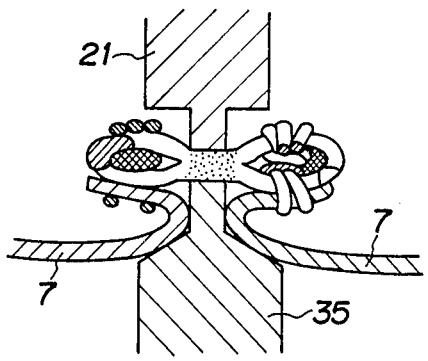
FIG. 5 is a sectional view taken along the line A—A of FIG. 3, showing the state wherein the anvil has already been lowered.

An ultrasonic horn 35 is provided below the anvil 21. The ultrasonic horn 35 induces a vibrational energy which is employed to melt a portion of the element rows 5 in order to form a bottom stop. As shown in FIG. 4, in its normal state, the ultrasonic horn 35 is not in contact with the element rows 5. The ultrasonic horn 35 is, however, allowed to contact the element rows 5 only when they are downwardly pushed by the downward movement of the anvil 21. The ultrasonic horn 35 then clamps, in cooperation with the anvil 21, a portion of the element rows 5 and melts the same to form a bottom stop as shown in FIG. 5.

The following is a description of the operation of the apparatus in accordance with the present invention.

Figure 10:
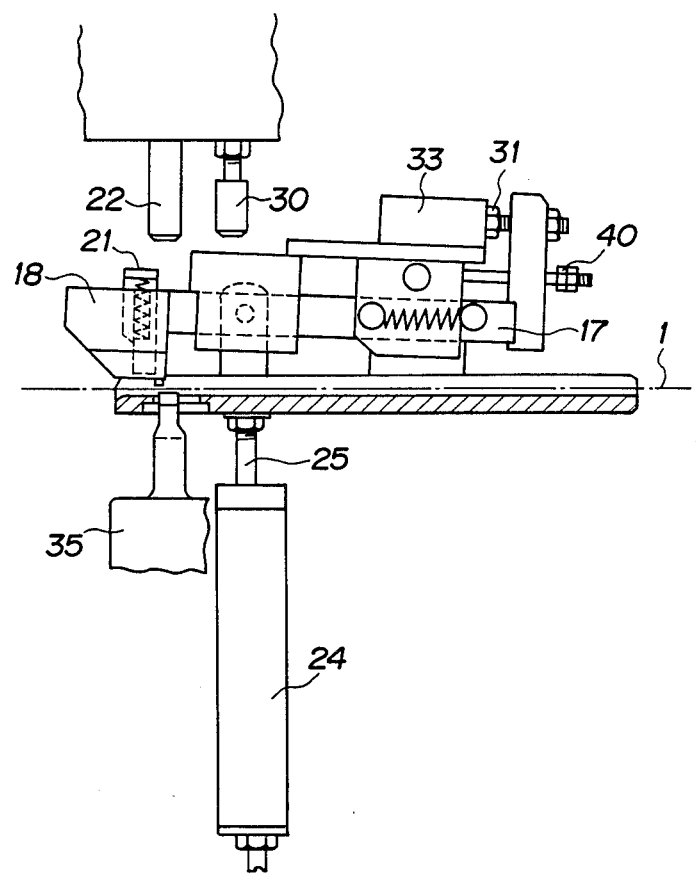
Figure 11:
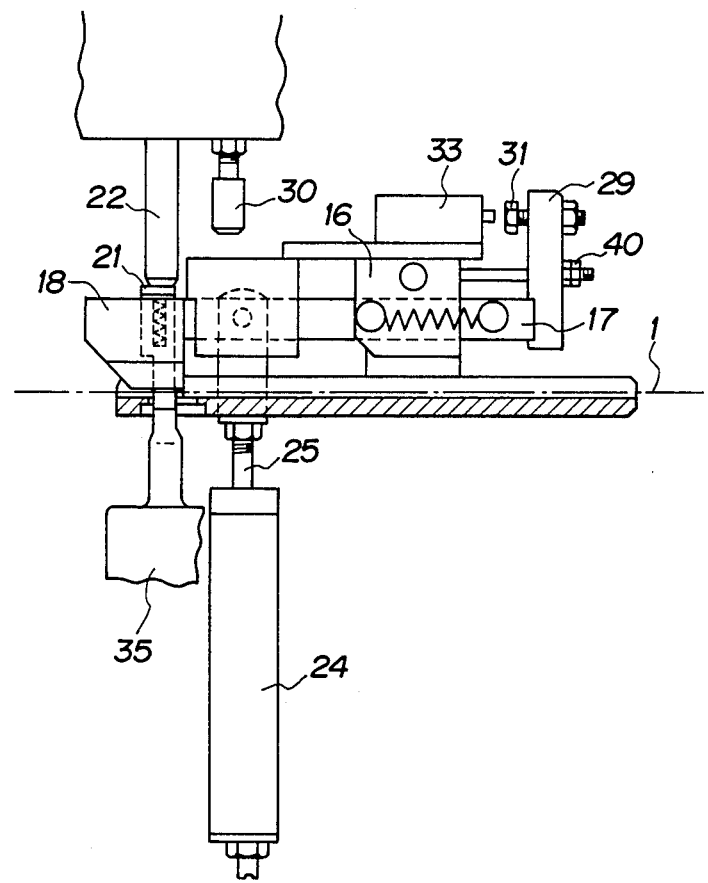

First of all, the air cylinder 24 is supplied with air in order to cause the slide rod 17 to pivot upwardly as shown in FIG. 9, whereby the projection 19 is removed from a space portion 6. The slide rod 17 removed from the space portion 6 is leftwardly moved by the action of the spring 32, thus causing the bolt 31 to turn ON the limit switch 33. The limit switch 33 turned ON actuates the feed rollers 3 and 4 to advance the fastener chain 1. When a subsequent space portion 6 reaches the position of the space sensor 8 as the result of the advancing operation, the lever 9 enters the space portion 6 to actuate the microswitch 11, whereby the air cylinder 24 is exhausted of air. When the air cylinder 24 has been exhausted of air, the piston rod 25 is downwardly moved by the action of the spring 27, thus bringing the projection 19 of the positioning member 18 into contact with the element rows 5 (see FIG. 10).

Under this state, when the space portion 6 reaches the position of the projection 19, it enters the space portion 6 to engage the element 34 at the rear edge of the space portion 6. Consequently, the slide rod 17 is rightwardly moved by the force applied thereto from the element 34 such as to cause the limit switch 33 to turn OFF, whereby the advance of the fastener chain 1 by the feed rollers 3 and 4 is stopped. Similarly, the plunger 22 is expanded by the action of the limit switch 33 such as to press the anvil 21, whereby a portion of the element rows 5 is clamped between the anvil 21 and the ultrasonic horn 35 and is meltformed into a bottom stop.

After melting has been effected for a predetermined period of time, the plunger 22 is raised. Thereafter, the air cylinder 24 is supplied with air, so that the slide rod 17 is upwardly swung such as to take the position shown in FIG. 9. In consequence, the microswitch 33 is turned ON to commence the advance of the fastener chain 1, and the same steps are repeated thereafter.

In the present invention, the movement of the anvil 21 is guided by the groove 20 which is provided on the positioning member 18 integrally formed with the projection 19. Therefore, there is no change in the relative positional relationship between the projection 19 and the anvil 21. Accordingly, it is possible to accurately regulate the position of a bottom stop with respect to the projection 19.

Further, as shown in FIG. 3, if the width of the anvil 21 is made smaller than that of the projection 19, then there is no possibility of the anvil 21 being located laterally outside the projection 19, and the positional relationship therebetween is kept unchanged. Thus, it is possible to reliably prevent any damage to the thread which is employed to sew the elements on the respective strips of tape.

Furthermore, it is possible to eliminate any gap between the anvil 21 and the projection 19 by providing the groove 20 such that the anvil 21 slides while contacting the projection 19 as in the case of the illustrated embodiment. Accordingly, it is possible to form a bottom stop in which the elements constituting the bottom stop have been completely melted as far as the lowermost end of the element rows 5.

What is claimed is:

1. An apparatus for melt-forming a bottom stop of a slide fastener chain which melt-forms a bottom stop on a continuous slide fastener chain alternately having a portion in which elements of a thermoplastic synthetic resin material are interlocked with each other and a space portion in which no element is present, said apparatus having: a device which advances said slide fastener chain; a positioning member having a positioning projection which is adapted to enter said space portion and to engage an element at the rear edge of said space portion; a device which is adapted to sense the engagement between said positioning projection and said element and to stop the advance of said fastener chain; an ultrasonic horn which is disposed in close proximity to said positioning projection; an anvil which is adapted to clamp and press said fastener chain between the same and said ultrasonic horn after said fastener chain has stopped, and a groove which is formed on said positioning member, one wall defining the groove being continuous with a side surface of the positioning projection which side surface engages the element at the rear edge of said space portion, said anvil being received in said groove for sliding movement on said side surface of the positioning projection, said anvil having a working portion of a width smaller than that of the positioning projection.

* * * * *